US012072860B2

(12) United States Patent
Hayes et al.

(10) Patent No.: US 12,072,860 B2
(45) Date of Patent: *Aug. 27, 2024

(54) DELEGATION OF DATA OWNERSHIP

(71) Applicant: PURE STORAGE, INC., Mountian View, CA (US)

(72) Inventors: John Hayes, Mountain View, CA (US); Robert Lee, Pebble Beach, CA (US); Igor Ostrovsky, Mountain View, CA (US); Peter Vajgel, Menlo Park, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,339

(22) Filed: Dec. 19, 2022

(65) Prior Publication Data
US 2023/0120685 A1    Apr. 20, 2023

Related U.S. Application Data

(63) Continuation of application No. 16/994,332, filed on Aug. 14, 2020, now Pat. No. 11,567,917, which is a
(Continued)

(51) Int. Cl.
*G06F 16/00* (2019.01)
*G06F 16/13* (2019.01)
(Continued)

(52) U.S. Cl.
CPC .......... *G06F 16/2219* (2019.01); *G06F 16/13* (2019.01); *G06F 16/907* (2019.01)

(58) Field of Classification Search
None
See application file for complete search history.

(56) References Cited

U.S. PATENT DOCUMENTS

| 5,390,327 | A | 2/1995 | Lubbers et al. |
| 5,450,581 | A | 9/1995 | Bergen et al. |

(Continued)

FOREIGN PATENT DOCUMENTS

| EP | 2164006 | 3/2010 |
| EP | 2256621 | 12/2010 |

(Continued)

OTHER PUBLICATIONS ("Serverless Network File Systems", ACM Transactions on Computer Systems (TOCS), Association for Computing Machinery, Inc., US, vol. 14, No. 1, Feb. 1, 1996 (Feb. 1, 1996) (Year: 1996).*
(Continued)

*Primary Examiner* — Hasanul Mobin

(57) ABSTRACT

A processor-based method for locating data and metadata closely together in a storage system is provided. The method includes writing a first range of a file and a first metadata relating to attributes of the file into at least one segment controlled by a first authority of the file. The method includes delegating, by the first authority, a second authority for a second range of the file, and writing the second range of the file and second metadata relating to the attributes of the file into at least one segment controlled by the second authority.

20 Claims, 4 Drawing Sheets

Related U.S. Application Data continuation of application No. 14/871,833, filed on Sep. 30, 2015, now Pat. No. 10,762,069.

(51) Int. Cl.
*G06F 16/22* (2019.01)
*G06F 16/907* (2019.01)

(56) References Cited

U.S. PATENT DOCUMENTS

| | | | |
|---|---|---|---|
| 5,479,653 A | 12/1995 | Jones | |
| 5,488,731 A | 1/1996 | Mendelsohn | |
| 5,504,858 A | 4/1996 | Ellis et al. | |
| 5,564,113 A | 10/1996 | Bergen et al. | |
| 5,574,882 A | 11/1996 | Menon et al. | |
| 5,649,093 A | 7/1997 | Hanko et al. | |
| 5,883,909 A | 3/1999 | Dekoning et al. | |
| 6,000,010 A | 12/1999 | Legg | |
| 6,260,156 B1 | 7/2001 | Garvin et al. | |
| 6,269,453 B1 | 7/2001 | Krantz | |
| 6,275,898 B1 | 8/2001 | DeKoning | |
| 6,453,428 B1 | 9/2002 | Stephenson | |
| 6,523,087 B2 | 2/2003 | Busser | |
| 6,535,417 B2 | 3/2003 | Tsuda | |
| 6,643,748 B1 | 11/2003 | Wieland | |
| 6,725,392 B1 | 4/2004 | Frey et al. | |
| 6,763,455 B2 | 7/2004 | Hall | |
| 6,836,816 B2 | 12/2004 | Kendall | |
| 6,985,995 B2 | 1/2006 | Holland et al. | |
| 7,032,125 B2 | 4/2006 | Holt et al. | |
| 7,047,358 B2 | 5/2006 | Lee et al. | |
| 7,051,155 B2 | 5/2006 | Talagala et al. | |
| 7,055,058 B2 | 5/2006 | Lee et al. | |
| 7,065,617 B2 | 6/2006 | Wang | |
| 7,069,383 B2 | 6/2006 | Yamamoto et al. | |
| 7,076,606 B2 | 7/2006 | Orsley | |
| 7,107,480 B1 | 9/2006 | Moshayedi et al. | |
| 7,159,150 B2 | 1/2007 | Kenchammana-Hosekote et al. | |
| 7,162,575 B2 | 1/2007 | Dalal et al. | |
| 7,164,608 B2 | 1/2007 | Lee | |
| 7,188,270 B1 | 3/2007 | Nanda et al. | |
| 7,228,352 B1 * | 6/2007 | Yaguchi | G06F 11/2041 714/E11.073 |
| 7,334,156 B2 | 2/2008 | Land et al. | |
| 7,370,220 B1 | 5/2008 | Nguyen et al. | |
| 7,386,666 B1 | 6/2008 | Beauchamp et al. | |
| 7,398,285 B2 | 7/2008 | Kisley | |
| 7,424,498 B1 | 9/2008 | Patterson | |
| 7,424,592 B1 | 9/2008 | Karr | |
| 7,444,532 B2 | 10/2008 | Masuyama et al. | |
| 7,480,658 B2 | 1/2009 | Heinla et al. | |
| 7,484,056 B2 | 1/2009 | Madnani et al. | |
| 7,484,057 B1 | 1/2009 | Madnani et al. | |
| 7,484,059 B1 | 1/2009 | Ofer et al. | |
| 7,536,506 B2 | 5/2009 | Ashmore et al. | |
| 7,558,859 B2 | 7/2009 | Kasiolas | |
| 7,565,446 B2 | 7/2009 | Talagala et al. | |
| 7,613,947 B1 | 11/2009 | Coatney | |
| 7,634,617 B2 | 12/2009 | Misra | |
| 7,634,618 B2 | 12/2009 | Misra | |
| 7,681,104 B1 | 3/2010 | Sim-Tang et al. | |
| 7,681,105 B1 | 3/2010 | Sim-Tang et al. | |
| 7,681,109 B2 | 3/2010 | Yang et al. | |
| 7,730,257 B2 | 6/2010 | Franklin | |
| 7,730,258 B1 | 6/2010 | Smith | |
| 7,730,274 B1 | 6/2010 | Usgaonkar | |
| 7,743,038 B1 * | 6/2010 | Goldick | G06F 16/1827 726/17 |
| 7,743,276 B2 | 6/2010 | Jacobsen et al. | |
| 7,752,489 B2 | 6/2010 | Deenadhayalan et al. | |
| 7,757,038 B2 | 7/2010 | Kitahara | |
| 7,757,059 B1 | 7/2010 | Ofer et al. | |
| 7,778,960 B1 | 8/2010 | Chatterjee et al. | |
| 7,783,955 B2 | 8/2010 | Haratsch et al. | |
| 7,814,272 B2 | 10/2010 | Barrall et al. | |
| 7,814,273 B2 | 10/2010 | Barrall | |
| 7,818,531 B2 | 10/2010 | Barrall | |
| 7,827,351 B2 | 11/2010 | Suetsugu et al. | |
| 7,827,439 B2 | 11/2010 | Matthew et al. | |
| 7,831,768 B2 | 11/2010 | Ananthamurthy et al. | |
| 7,856,583 B1 | 12/2010 | Smith | |
| 7,870,105 B2 | 1/2011 | Arakawa et al. | |
| 7,873,878 B2 | 1/2011 | Belluomini et al. | |
| 7,885,938 B1 | 2/2011 | Greene et al. | |
| 7,886,111 B2 | 2/2011 | Klemm et al. | |
| 7,908,448 B1 | 3/2011 | Chatterjee et al. | |
| 7,916,538 B2 | 3/2011 | Jeon et al. | |
| 7,921,268 B2 | 4/2011 | Jakob | |
| 7,930,499 B2 | 4/2011 | Duchesne | |
| 7,941,697 B2 | 5/2011 | Mathew et al. | |
| 7,958,303 B2 | 6/2011 | Shuster | |
| 7,971,129 B2 | 6/2011 | Watson | |
| 7,975,115 B2 | 7/2011 | Wayda | |
| 7,984,016 B2 | 7/2011 | Kisley | |
| 7,991,822 B2 | 8/2011 | Bish et al. | |
| 8,006,126 B2 | 8/2011 | Deenadhayalan et al. | |
| 8,010,485 B1 | 8/2011 | Chatterjee et al. | |
| 8,010,829 B1 | 8/2011 | Chatterjee et al. | |
| 8,020,047 B2 | 9/2011 | Courtney | |
| 8,046,548 B1 | 10/2011 | Chatterjee et al. | |
| 8,051,361 B2 | 11/2011 | Sim-Tang et al. | |
| 8,051,362 B2 | 11/2011 | Li et al. | |
| 8,074,038 B2 | 12/2011 | Lionetti et al. | |
| 8,082,393 B2 | 12/2011 | Galloway et al. | |
| 8,086,603 B2 | 12/2011 | Nasre et al. | |
| 8,086,634 B2 | 12/2011 | Mimatsu | |
| 8,086,911 B1 | 12/2011 | Taylor | |
| 8,090,837 B2 | 1/2012 | Shin et al. | |
| 8,108,502 B2 | 1/2012 | Tabbara et al. | |
| 8,117,388 B2 | 2/2012 | Jernigan, IV | |
| 8,117,521 B2 | 2/2012 | Yang et al. | |
| 8,140,821 B1 | 3/2012 | Raizen et al. | |
| 8,145,838 B1 * | 3/2012 | Miller | G06F 11/2035 711/161 |
| 8,145,840 B2 | 3/2012 | Koul et al. | |
| 8,175,012 B2 | 5/2012 | Haratsch et al. | |
| 8,176,360 B2 | 5/2012 | Frost et al. | |
| 8,176,405 B2 | 5/2012 | Hafner et al. | |
| 8,180,855 B2 | 5/2012 | Aiello et al. | |
| 8,200,922 B2 | 6/2012 | Mckean et al. | |
| 8,209,469 B2 | 6/2012 | Carpenter et al. | |
| 8,225,006 B1 | 7/2012 | Karamcheti | |
| 8,239,618 B2 | 8/2012 | Kotzur et al. | |
| 8,244,999 B1 | 8/2012 | Chatterjee et al. | |
| 8,261,016 B1 | 9/2012 | Goel | |
| 8,271,455 B2 | 9/2012 | Kesselman | |
| 8,285,686 B2 | 10/2012 | Kesselman | |
| 8,305,811 B2 | 11/2012 | Jeon | |
| 8,315,999 B2 | 11/2012 | Chatley et al. | |
| 8,327,080 B1 | 12/2012 | Der | |
| 8,335,769 B2 | 12/2012 | Kesselman | |
| 8,341,118 B2 | 12/2012 | Drobychev et al. | |
| 8,351,290 B1 | 1/2013 | Huang et al. | |
| 8,364,920 B1 | 1/2013 | Parkison et al. | |
| 8,365,041 B2 | 1/2013 | Chu et al. | |
| 8,375,146 B2 | 2/2013 | Sinclair | |
| 8,397,016 B2 | 3/2013 | Talagala et al. | |
| 8,402,152 B2 | 3/2013 | Duran | |
| 8,412,880 B2 | 4/2013 | Leibowitz et al. | |
| 8,423,739 B2 | 4/2013 | Ash et al. | |
| 8,429,436 B2 | 4/2013 | Filingim et al. | |
| 8,452,928 B1 | 5/2013 | Ofer et al. | |
| 8,473,698 B2 | 6/2013 | Lionetti et al. | |
| 8,473,778 B2 | 6/2013 | Simitci | |
| 8,473,815 B2 | 6/2013 | Yu et al. | |
| 8,479,037 B1 | 7/2013 | Chatterjee et al. | |
| 8,484,414 B2 | 7/2013 | Sugimoto et al. | |
| 8,495,472 B1 | 7/2013 | Magerramov | |
| 8,498,967 B1 | 7/2013 | Chatterjee et al. | |
| 8,504,797 B2 | 8/2013 | Mimatsu | |
| 8,522,073 B2 | 8/2013 | Cohen | |
| 8,533,408 B1 | 9/2013 | Madnani et al. | |
| 8,533,527 B2 | 9/2013 | Daikokuya et al. | |
| 8,539,177 B1 | 9/2013 | Ofer et al. | |

(56) References Cited

U.S. PATENT DOCUMENTS

| | | |
|---|---|---|
| 8,544,029 B2 | 9/2013 | Bakke et al. |
| 8,549,224 B1 | 10/2013 | Zeryck et al. |
| 8,583,861 B1 | 11/2013 | Ofer et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |
| 8,671,072 B1 | 3/2014 | Shah et al. |
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey et al. |
| 8,719,621 B1 | 5/2014 | Karmarkar |
| 8,725,730 B2 | 5/2014 | Keeton et al. |
| 8,751,859 B2 | 6/2014 | Becker-Szendy et al. |
| 8,756,387 B2 | 6/2014 | Frost et al. |
| 8,762,793 B2 | 6/2014 | Grube et al. |
| 8,838,541 B2 | 6/2014 | Camble et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,822,155 B2 | 9/2014 | Sukumar |
| 8,824,261 B1 | 9/2014 | Miller et al. |
| 8,832,528 B2 | 9/2014 | Thatcher et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes |
| 8,874,836 B1 | 10/2014 | Hayes |
| 8,880,793 B2 | 11/2014 | Nagineni |
| 8,880,825 B2 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 * | 4/2015 | Hayes ............... G06F 11/1451 711/111 |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,047,214 B1 | 6/2015 | Sharon et al. |
| 9,053,808 B2 | 6/2015 | Sprouse |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,087,012 B1 * | 7/2015 | Hayes ............... G06F 11/2094 |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,123,422 B2 | 9/2015 | Sharon et al. |
| 9,124,300 B2 | 9/2015 | Olbrich et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,244,927 B1 * | 1/2016 | Ravan ............... G06F 16/113 |
| 9,250,687 B1 | 2/2016 | Aswadhati |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman et al. |
| 9,275,063 B1 | 3/2016 | Natanzon |
| 9,280,678 B2 | 3/2016 | Redberg |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Murin |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,395,922 B2 | 7/2016 | Nishikido |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Klein |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Chamness et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Sharon et al. |
| 9,619,430 B2 | 4/2017 | Kannan et al. |
| 9,645,754 B2 | 5/2017 | Li et al. |

(56) References Cited

U.S. PATENT DOCUMENTS

| | | |
|---|---|---|
| 9,667,720 B1 | 5/2017 | Bent et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |
| 9,811,285 B1 | 11/2017 | Karamcheti et al. |
| 9,811,546 B1 | 11/2017 | Bent et al. |
| 9,818,478 B2 | 11/2017 | Chung et al. |
| 9,829,066 B2 | 11/2017 | Thomas et al. |
| 9,836,245 B2 | 12/2017 | Hayes et al. |
| 9,864,874 B1 | 1/2018 | Shanbhag |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,952,809 B2 | 2/2018 | Shah |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,959,167 B1 | 5/2018 | Donlan et al. |
| 9,965,539 B2 | 5/2018 | D'halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Litsyn et al. |
| 10,019,317 B2 | 7/2018 | Usvyatsky et al. |
| 10,025,673 B1 | 7/2018 | Maccanti |
| 10,031,703 B1 | 7/2018 | Natanzon et al. |
| 10,061,512 B2 | 8/2018 | Chu et al. |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Lin |
| 10,089,176 B1 | 10/2018 | Donlan et al. |
| 10,102,356 B1 | 10/2018 | Sahin |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Chung et al. |
| 10,162,704 B1 | 12/2018 | Kirschner et al. |
| 10,180,875 B2 | 1/2019 | Northcott |
| 10,185,495 B2 | 1/2019 | Katsuki |
| 10,185,730 B2 | 1/2019 | Bestler et al. |
| 10,216,754 B1* | 2/2019 | Douglis ............... G06F 16/1744 |
| 10,235,065 B1 | 3/2019 | Miller et al. |
| 10,324,639 B2 | 6/2019 | Seo |
| 10,567,406 B2 | 2/2020 | Astigarraga |
| 10,606,901 B1* | 3/2020 | Nair .................... G06F 16/122 |
| 10,762,069 B2 | 9/2020 | Hayes et al. |
| 10,810,088 B1 | 10/2020 | Gu |
| 10,846,137 B2 | 11/2020 | Vallala |
| 10,877,683 B2 | 12/2020 | Wu |
| 11,076,509 B2 | 7/2021 | Alissa et al. |
| 11,106,810 B2 | 8/2021 | Natanzon |
| 11,194,707 B2 | 12/2021 | Stalzer |
| 11,567,917 B2 | 1/2023 | Hayes et al. |
| 2002/0144059 A1 | 10/2002 | Kendall |
| 2003/0028493 A1* | 2/2003 | Tajima ............... G06Q 20/3674 705/67 |
| 2003/0105984 A1 | 6/2003 | Masuyama et al. |
| 2003/0110205 A1 | 6/2003 | Johnson |
| 2003/0220923 A1* | 11/2003 | Curran .................... G06F 16/10 |
| 2004/0133570 A1* | 7/2004 | Soltis .................... G06F 16/182 |
| 2004/0161086 A1 | 8/2004 | Buntin et al. |
| 2004/0254907 A1* | 12/2004 | Crow ..................... G06F 16/10 |
| 2005/0001652 A1 | 1/2005 | Malik et al. |
| 2005/0038790 A1* | 2/2005 | Wolthusen ............. H04L 63/20 |
| 2005/0076228 A1 | 4/2005 | Davis et al. |
| 2005/0183002 A1* | 8/2005 | Chapus ................. G06F 40/174 707/999.1 |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0088754 A1* | 4/2007 | Brannon ............. G06F 16/2365 |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2007/0288494 A1* | 12/2007 | Chrin ...................... G06F 16/10 |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0228770 A1* | 9/2008 | Halcrow ............... G06F 16/119 |
| 2008/0256141 A1 | 10/2008 | Wayda et al. |
| 2008/0295118 A1 | 11/2008 | Liao |
| 2009/0063508 A1* | 3/2009 | Yamato .................. G06F 16/13 |
| 2009/0077208 A1 | 3/2009 | Nguyen et al. |
| 2009/0112951 A1* | 4/2009 | Ryu ...................... G06F 12/023 |
| 2009/0138654 A1 | 5/2009 | Sutardja |
| 2009/0193483 A1* | 7/2009 | Hwang ............ H04N 21/64322 725/120 |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0030791 A1* | 2/2010 | Iverson ............... G06F 16/1737 713/320 |
| 2010/0042636 A1 | 2/2010 | Lu |
| 2010/0077013 A1* | 3/2010 | Clements ............ G06F 16/1748 707/822 |
| 2010/0088349 A1* | 4/2010 | Parab .................. G06F 16/1748 707/821 |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0165503 A1* | 7/2010 | Choi .................. G11B 20/1258 360/75 |
| 2010/0169707 A1 | 7/2010 | Mathew et al. |
| 2010/0174576 A1 | 7/2010 | Naylor |
| 2010/0185626 A1 | 7/2010 | Hillis et al. |
| 2010/0268908 A1 | 10/2010 | Ouyang et al. |
| 2010/0306500 A1 | 12/2010 | Mimatsu |
| 2011/0035540 A1 | 2/2011 | Fitzgerald |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0184964 A1* | 7/2011 | Li ............................ G06F 16/40 707/756 |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0233293 A1 | 9/2012 | Barton et al. |

(56) References Cited

U.S. PATENT DOCUMENTS

| | | | |
|---|---|---|---|
| 2012/0246194 A1* | 9/2012 | Annapragada | G06F 16/2471 |
| | | | 707/E17.014 |
| 2012/0246435 A1 | 9/2012 | Meir et al. | |
| 2012/0260055 A1 | 10/2012 | Murase | |
| 2012/0278382 A1* | 11/2012 | Faith | G06F 16/183 |
| | | | 709/203 |
| 2012/0311557 A1 | 12/2012 | Resch | |
| 2013/0022201 A1 | 1/2013 | Glew et al. | |
| 2013/0036314 A1 | 2/2013 | Glew et al. | |
| 2013/0042056 A1 | 2/2013 | Shats | |
| 2013/0060884 A1 | 3/2013 | Bernbo et al. | |
| 2013/0067188 A1 | 3/2013 | Mehra et al. | |
| 2013/0067242 A1* | 3/2013 | Lyakhovitskiy | G06F 21/78 |
| | | | 713/193 |
| 2013/0073894 A1 | 3/2013 | Xavier et al. | |
| 2013/0124776 A1 | 5/2013 | Hallak et al. | |
| 2013/0132800 A1 | 5/2013 | Healy et al. | |
| 2013/0151653 A1 | 6/2013 | Sawiki | |
| 2013/0151771 A1 | 6/2013 | Tsukahara et al. | |
| 2013/0173853 A1 | 7/2013 | Ungureanu et al. | |
| 2013/0238554 A1 | 9/2013 | Yucel et al. | |
| 2013/0339314 A1 | 12/2013 | Carpenter et al. | |
| 2013/0339635 A1 | 12/2013 | Amit et al. | |
| 2013/0339818 A1 | 12/2013 | Baker et al. | |
| 2014/0019497 A1 | 1/2014 | Cidon et al. | |
| 2014/0040535 A1 | 2/2014 | Lee | |
| 2014/0040702 A1 | 2/2014 | He et al. | |
| 2014/0047263 A1 | 2/2014 | Coatney et al. | |
| 2014/0047269 A1 | 2/2014 | Kim | |
| 2014/0063721 A1 | 3/2014 | Herman et al. | |
| 2014/0064048 A1 | 3/2014 | Cohen et al. | |
| 2014/0068224 A1 | 3/2014 | Fan et al. | |
| 2014/0075252 A1 | 3/2014 | Luo et al. | |
| 2014/0122510 A1 | 5/2014 | Namkoong et al. | |
| 2014/0136880 A1 | 5/2014 | Shankar et al. | |
| 2014/0181402 A1 | 6/2014 | White | |
| 2014/0220561 A1 | 8/2014 | Sukumar et al. | |
| 2014/0237164 A1 | 8/2014 | Le et al. | |
| 2014/0279936 A1 | 9/2014 | Bernbo et al. | |
| 2014/0280025 A1 | 9/2014 | Eidson et al. | |
| 2014/0289588 A1 | 9/2014 | Nagadomi et al. | |
| 2014/0330785 A1 | 11/2014 | Isherwood et al. | |
| 2014/0372838 A1 | 12/2014 | Lou et al. | |
| 2014/0380125 A1 | 12/2014 | Calder et al. | |
| 2014/0380126 A1 | 12/2014 | Yekhanin et al. | |
| 2015/0032720 A1 | 1/2015 | James | |
| 2015/0039645 A1 | 2/2015 | Lewis | |
| 2015/0039849 A1 | 2/2015 | Lewis | |
| 2015/0089283 A1 | 3/2015 | Kermarrec et al. | |
| 2015/0100746 A1 | 4/2015 | Rychlik | |
| 2015/0134824 A1 | 5/2015 | Mickens | |
| 2015/0153800 A1 | 6/2015 | Lucas et al. | |
| 2015/0154418 A1 | 6/2015 | Redberg | |
| 2015/0161163 A1* | 6/2015 | Cypher | G06F 16/1748 |
| | | | 707/610 |
| 2015/0180714 A1 | 6/2015 | Chunn | |
| 2015/0280959 A1 | 10/2015 | Vincent | |
| 2015/0355974 A1* | 12/2015 | Hayes | G06F 11/1096 |
| | | | 714/15 |
| 2016/0026397 A1 | 1/2016 | Nishikido et al. | |
| 2016/0246537 A1 | 2/2016 | Kim | |
| 2016/0182542 A1 | 6/2016 | Staniford | |
| 2016/0191508 A1 | 6/2016 | Bestler et al. | |
| 2016/0248631 A1 | 8/2016 | Duchesneau | |
| 2016/0378612 A1 | 12/2016 | Hipsh et al. | |
| 2017/0053195 A1* | 2/2017 | Sasajima | H04N 1/0035 |
| 2017/0091236 A1 | 3/2017 | Hayes et al. | |
| 2017/0103092 A1 | 4/2017 | Hu et al. | |
| 2017/0103094 A1 | 4/2017 | Hu et al. | |
| 2017/0103098 A1 | 4/2017 | Hu et al. | |
| 2017/0103116 A1 | 4/2017 | Hu et al. | |
| 2017/0177236 A1 | 6/2017 | Haratsch et al. | |
| 2017/0262202 A1 | 9/2017 | Seo | |
| 2018/0039442 A1 | 2/2018 | Shadrin et al. | |
| 2018/0054454 A1 | 2/2018 | Astigarraga et al. | |
| 2018/0081958 A1 | 3/2018 | Akirav et al. | |
| 2018/0101441 A1 | 4/2018 | Hyun et al. | |
| 2018/0101587 A1 | 4/2018 | Anglin et al. | |
| 2018/0101588 A1 | 4/2018 | Anglin et al. | |
| 2018/0217756 A1 | 8/2018 | Liu et al. | |
| 2018/0307560 A1 | 10/2018 | Vishnumolakala et al. | |
| 2018/0321874 A1 | 11/2018 | Li et al. | |
| 2019/0036703 A1 | 1/2019 | Bestler | |
| 2019/0220315 A1 | 7/2019 | Vallala et al. | |
| 2020/0034560 A1 | 1/2020 | Natanzon et al. | |
| 2020/0326871 A1 | 10/2020 | Wu et al. | |
| 2020/0379965 A1* | 12/2020 | Hayes | G06F 16/2219 |
| 2021/0360833 A1 | 11/2021 | Alissa et al. | |
| 2023/0120685 A1* | 4/2023 | Hayes | G06F 16/13 |
| | | | 707/737 |

FOREIGN PATENT DOCUMENTS

| | | |
|---|---|---|
| JP | 2010128886 A | 6/2010 |
| JP | 2013539133 A | 10/2013 |
| JP | 2013544386 A | 12/2013 |
| WO | WO 02-13033 | 2/2002 |
| WO | WO 2008103569 | 8/2008 |
| WO | WO 2008157081 | 12/2008 |
| WO | WO 2013032825 | 7/2013 |
| WO | WO-2013106079 A1 | 7/2013 |
| WO | WO2014025821 A2 | 2/2014 |

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

International Search Report and the Written Opinion of the International Searching Authority, PCT/US2015/039135, dated Sep. 18, 2015.

International Search Report and the Written Opinion of the International Searching Authority, PCT/US2015/039136, dated Sep. 23, 2015.

International Search Report, PCT/US2015/039142, dated Sep. 24, 2015.

International Search Report, PCT/US2015/034291, dated Sep. 30, 2015.

International Search Report and the Written Opinion of the International Searching Authority, PCT/US2015/039137, dated Oct. 1, 2015.

International Search Report, PCT/US2015/044370, dated Dec. 15, 2015.

International Search Report amd the Written Opinion of the International Searching Authority, PCT/US2016/031039, dated May 5, 2016.

International Search Report, PCT/US2016/014604, dated May 19, 2016.

International Search Report, PCT/US2016/014361, dated May 30, 2016.

(56) References Cited

OTHER PUBLICATIONS

International Search Report, PCT/US2016/014356, dated Jun. 28, 2016.
International Search Report, PCT/US2016/014357, dated Jun. 29, 2016.
International Seach Report and the Written Opinion of the International Searching Authority, PCT/US2016/016504, dated Jul. 6, 2016.
International Seach Report and the Written Opinion of the International Searching Authority, PCT/US2016/024391, dated Jul. 12, 2016.
International Seach Report and the Written Opinion of the International Searching Authority, PCT/US2016/026529, dated Jul. 19, 2016.
International Seach Report and the Written Opinion of the International Searching Authority, PCT/US2016/023485, dated Jul. 21, 2016.
International Seach Report and the Written Opinion of the International Searching Authority, PCT/US2016/033306, dated Aug. 19, 2016.
International Seach Report and the Written Opinion of the International Searching Authority, PCT/US2016/047808, dated Nov. 25, 2016.
Stalzer, Mark A., "FlashBlades: System Architecture and Applications," Proceedings of the 2nd Workshop on Architectures and Systems for Big Data, Association for Computing Machinery, New York, NY, 2012, pp. 10-14.
International Seach Report and the Written Opinion of the International Searching Authority, PCT/US2016/042147, dated Nov. 30, 2016.
Extended European Search Report for European Application No. 16852470.0, mailed Feb. 14, 2019, 10 Pages.
International Search Report and Written Opinion for International Application No. PCT/US2016/054142, mailed Jan. 12, 2017, 11 Pages.

* cited by examiner

DELEGATION OF DATA OWNERSHIP

BACKGROUND

Storage systems are being designed and built for a wide range of amounts of data and sizes of files. Large files tend to create system bottlenecks especially for distributed storage systems. When a large file ties up the resources of a particular processor, for example in a storage node of a storage cluster, attempts to access other files under control of that same processor or node may experience delays. This can be especially problematic during transfer or backup of large files, when frequent appending to a file is occurring.

It is within this context that the embodiments arise.

SUMMARY

In some embodiments, a processor-based method for locating data and metadata closely together in a storage system is provided. The method includes writing a first range of a file and a first metadata relating to attributes of the file into at least one segment controlled by a first authority of the file. The method includes delegating, by the first authority, a second authority for a second range of the file, and writing the second range of the file and second metadata relating to the attributes of the file into at least one segment controlled by the second authority.

In some embodiments, a storage system is provided. The storage system includes storage memory having a plurality of segments and at least one processor. The at least one processor is configured to write data of a file and metadata pertaining to the file into the plurality of segments under a plurality of authorities, wherein a first range of the data of the file and a first metadata relating to attributes of the file are in at least one segment controlled by a first authority of the file. A second range of the data of the file and a second metadata are in at least one segment controlled by a second authority, and wherein the first authority of the file is configured to delegate ownership of a range of data of the file.

In some embodiments, a non-transitory computer readable medium having instructions when executed by a processor, cause the processor to perform actions. The actions include writing a first range of a file and a first metadata relating to attributes of the file into at least one segment controlled by a first authority of the file. The action include delegating, by the first authority, a second authority for a second range of the file, and writing the second range of the file and second metadata relating to the attributes of the file into at least one segment controlled by the second authority.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A storage system is described where data for a range of a file and metadata associated with that data are located relatively closely together or proximate to each other in at least one segment of storage memory. This proximity of the data and metadata makes data access more efficient, and provides organized locations for various types of metadata such as mapping information and file attributes, among other metadata. The organization of segments of storage memory is applicable to various storage systems, including a storage cluster with distributed storage nodes as shown in some embodiments. Authorities in the storage system direct or manage metadata and data in the segments. An authority of an inode or file can delegate or assign a delegated authority each time it is determined an offset of data or the range of the file is associated with a differing segment in some embodiments. Any appending to the file is then made to the segment controlled by the delegated authority. The authority of an inode, which may be referred to as the original or initial authority, tracks which authority is the delegated authority, and persists the assignment of the delegated authority, for example with a token in some embodiments. Some attributes of the file, including the file size, modification time and/or permissions, are recorded in metadata in the segment controlled by the delegated authority, in various embodiments.

Figure 1:
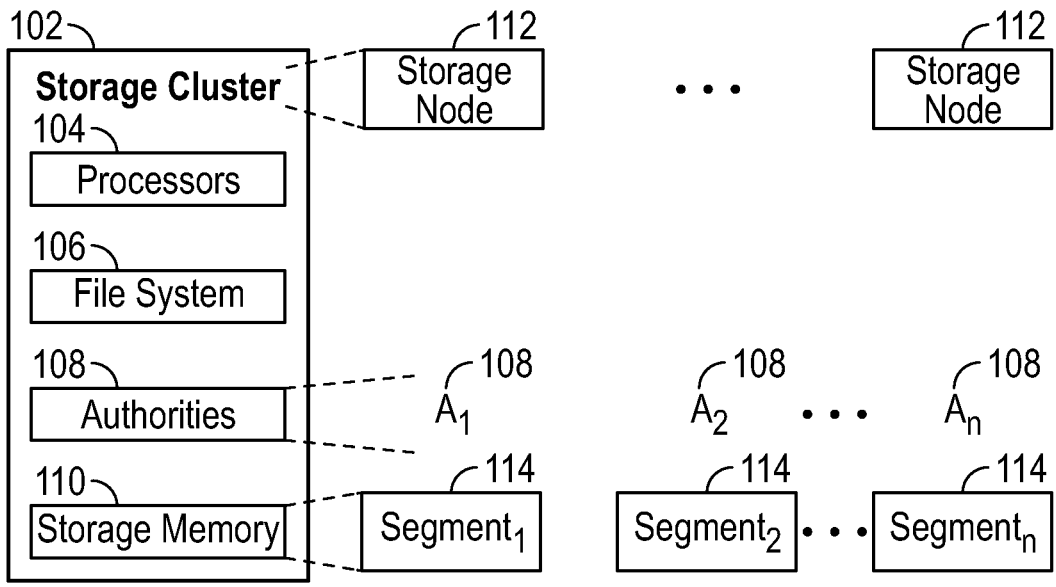
FIG. 1 is a block diagram of a storage cluster with multiple storage nodes, which acts as a system where data and metadata are located closely together in accordance with some embodiments.

FIG. 1 is a block diagram of a storage cluster 102 with multiple storage nodes 112, which acts as a system where data and metadata are located closely together. Embodiments with segments 114 of storage memory 110 and proximity of data and metadata are not limited to storage clusters 102, and may also include various types of storage systems such as storage arrays and storage devices, with various types of storage memory. The storage cluster 102 has one or more processors 104. Some embodiments have one or more processors in each storage node 112. A file system 106 operates in the storage cluster 102, for example as executed by the processors 104. Authorities 108 can be implemented as software constructs, using software executing on the processors 104. Each authority 108 is an owner of a range of a file or data. In some embodiments, each storage node 112, or many but not all of the storage nodes 112, has one or more authorities 108, and these authorities 108 direct or manage data and metadata. For each range of a file that is written into or read out of the storage cluster 102, there is one authority 108 of the inode for the file. Storage memory 110 may be organized as segments$_{1-n}$ 114.

The segments$_{1-n}$ 114 could be logical segments of memory, or physical segments of memory, or both. In one embodiment, the segments$_{1-n}$ 114 are logical segments, each of which is distributed across multiple storage nodes 112 with redundancy and/or erasure coding, and one or more levels of mapping from the logical segments to the physical segments.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage coupled to the host CPUs in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit within storage memory 110 may be assigned a range of address space in some embodiments. Within this assigned range, the non-volatile solid state storage unit is able to allocate addresses without synchronization with other non-volatile solid state storage.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout. It should be appreciated that the embodiments described herein may be integrated into the system of the assignee in one example.

Figure 2:
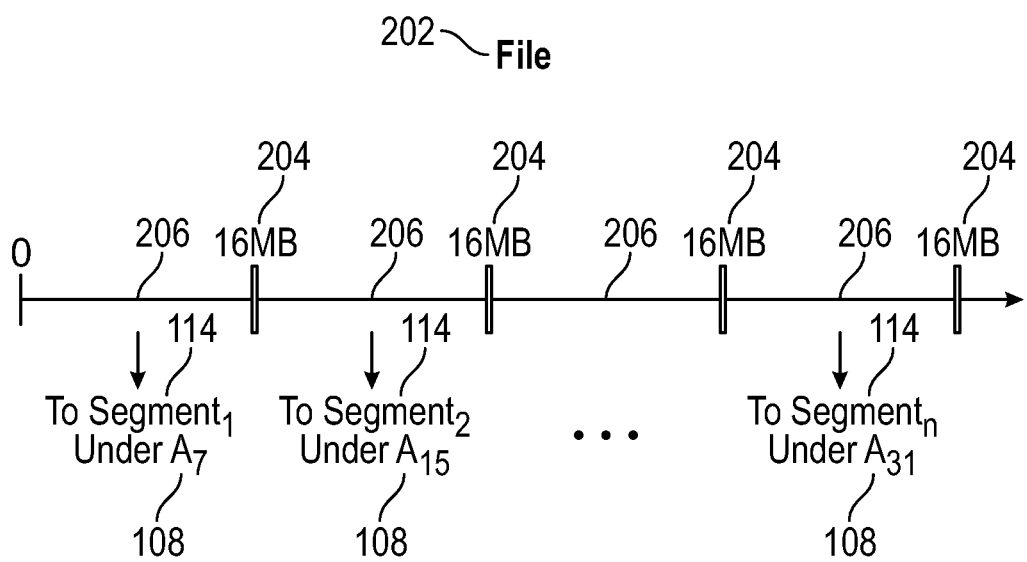
FIG. 2 is a diagram of how a relatively large file may be segmented or broken up into pieces of data, each sent to a segment under an authority in accordance with some embodiments.

FIG. 2 is a diagram of how a file 202 may be segmented or broken up into pieces of data or ranges of the file, and each piece sent to a segment 114 under a corresponding authority 108. The sizes of data chunks 206, and the labels for the authorities 108 are by example only, and should not be seen as limiting. Data chunks 206 may be referred to as a range of a file. In this example, each data chunk 206 starts at one logical offset 204 and ends at the next logical offset 204, and has a specified size of 16 MB (megabytes), and the authorities 108 are shown as A7, A15 and A31. The labeling or numbering of authorities 108 need not be sequential. The specified size (16 MB) and logical offset 204 could be the same, or different, for each of the segments$_{1-n}$ 114, in various embodiments. In some embodiments, the specified size and logical offset 204 are tunable, for example tunable to the system, or tunable to types of memory or sizes of segments 114, etc. The data may be compressed for writing to the segments$_{1-n}$ 114 in some embodiments. A relatively small file of less than the specified size, and fitting within one specified amount of logical offset 204 can be written entirely to a segment 114 under the authority 108 of the inode of the file, for example the authority 108 labeled A7. Metadata for that same file is also written to that same segment 114 under that same authority 108 in some embodiments. Thus, for a small file, all of the metadata and all of the data for the file are stored in proximity in one segment 114 under control of one authority 108. It should be appreciated that the data or the range of the file and the meta data for that range of the file may be stored in differing segments in some embodiments as the examples provided are illustrative and not meant to be limiting.

File 202 may initially be stored with a first chunk 206 of data of the file written to the segment$_1$ 114 under control of the authority 108 of the inode of the file, e.g., A7, and the metadata for the file also written to that same segment 114 under that same authority 108. Once the logical address of further appended data or a further range of the file becomes associated with a logical offset 204 for a differing segment (segment$_2$), the authority 108 of the inode of the file assigns a delegated authority 108, for example A15. The further range of the file is written to segment 114$_2$ under the delegated authority 108 (A15), along with further metadata in some embodiments. As mentioned above, the data (range of the file) and the metadata for that range of the file may be written to differing segments, in some embodiments. Once the amount of data stored in segment$_2$ 114 reaches the predefined limit for a segment 114, i.e., the address reaches the next logical offset 204, the authority 108 (A7) of the inode of the file assigns a new delegated authority 108, for example A31. This next chunk 206 of data for the file, up to the next logical offset 204, is written to segment$_n$ 114 under the new delegated authority 108 (A31). This process is iterative, as indicated by the " . . . " in FIG. 2, so that as a file grows, e.g., is appended, or a very large file is encountered, a greater number of segments$_{1-n}$ 114 are allocated to the file, and the authorities continue to be delegated for each segment as described above. The original authority 108 (A7) is referred to as the authority of the inode of the file. This process is further described and shown, along with organization of the data segments 114, in FIG. 3.

Figure 3:
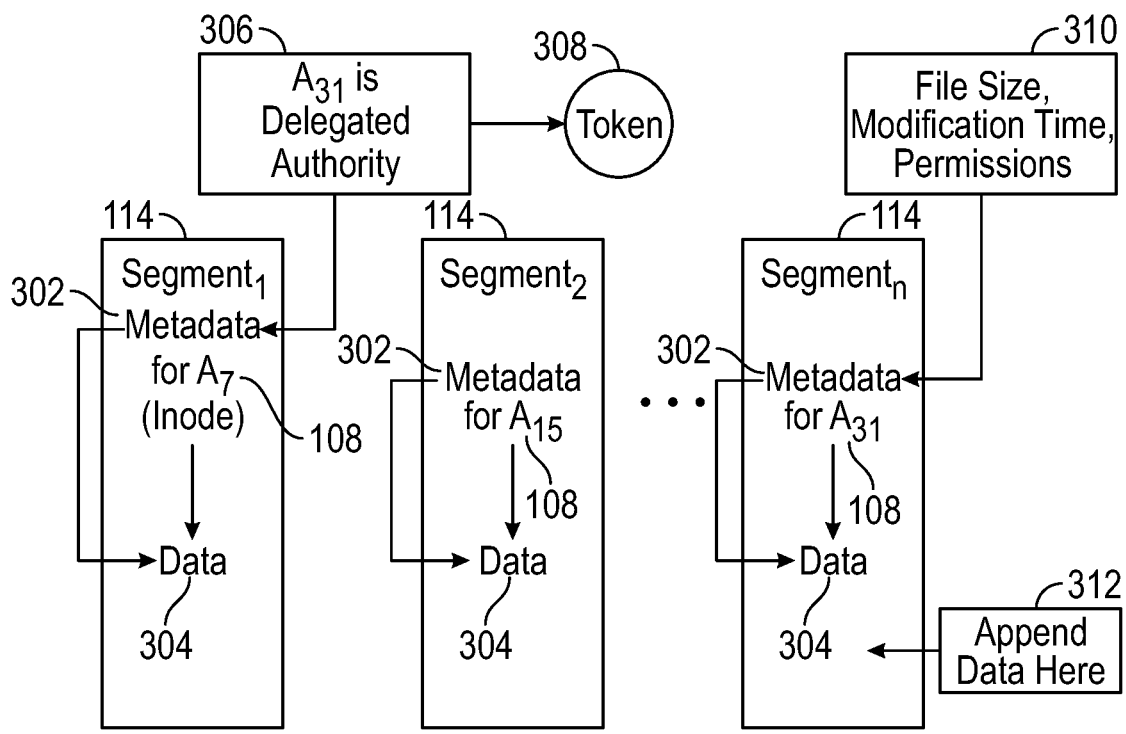
FIG. 3 is a diagram showing segments of the storage memory of the system of FIG. 1, with details on how metadata and data are arranged in each segment in accordance with some embodiments.

FIG. 3 is a diagram showing segments 114 of the storage memory 110 of the system of FIG. 1, with details on how metadata 302 and data 304 are arranged in each segment 114 in accordance with some embodiments. In this example, as in FIG. 2, the authority 108 labeled A7 is the authority for the inode of the file, and the authority 108 labeled A31 is the latest or most recently delegated authority 108, as delegated by the authority for the inode (A7). In the segment 114 under control of the authority 108 for the inode (A7), the first chunk 206 of data 304 of the file 202 is written along with some of the metadata 302 for the file. The metadata 302 relates to attributes of the file. Included in that metadata 302 is a pointer or mapping information to the data 304 in that segment 114. This could be in the form of mapping the logical offset of the data 304 to a logical offset in the segment 114, a map to a physical offset, and/or information about a particular segment/page pair. In some embodiments, each segment 114 is organized into multiple pages (e.g., logical pages in a logical segment), and one of the pages includes a directory (as metadata) that indicates what the logical offset (e.g., a write offset) is, in the page, for the data. As noted above, the data and the corresponding metadata for the data may or may not be stored in the same segment.

Still referring to FIGS. 2 and 3, after the first chunk 206 of data 304, up to the first logical offset 204, and metadata 302 of the file 202 are written to the segment$_1$ 114 under control of the authority 108 of the inode for the file (A7), the next chunk 206 of data 304 up to the next logical offset 204, and more metadata 302, are written to the next segment$_2$ 114. This next segment$_2$ 114 is under control of an authority 108 (A15) that is delegated by the authority of the inode (A7). In the example shown in FIG. 3, this next chunk 206 of data 304 and metadata 302 are written to the segment$_2$ 114 under control of the authority 108 labeled A15. During the time of writing of that data 304, that authority 108 (A15) is the delegated authority, as assigned by the authority of the inode (A7). Upon determination that a range of the file is associated with write offset of a differing segment, the authority of the inode (A7) delegates another authority 108 (A31), and data 304 and possibly metadata 302 for that data are then written to the segment$_n$ 114 under control of that delegated authority 108 (A31). This iterative process continues for as long as there is more data, or data continues to be appended to the file. Thus, in some embodiments once the amount of data reaches a predefined limit for the amount of data that should be written to a segment under control of an authority 108, i.e., the address of the data reaches the next logical offset for a differing segment, further authorities are delegated to accommodate appending to the file or a large file.

In the example shown in FIG. 3, the latest or most recent delegated authority 108 is the authority 108 labeled A31. The authority for the inode (A7) persists the delegation of the authority 108 (A31) using a token 308 in some embodiments. It should be appreciated that a token is one example of persisting the delegation of the authority and is not meant to be limiting. In some embodiments, there are redundant copies of metadata showing the persistence of the delegation of the authority 108 or the persisting uses an interlock mechanism. The authority 108 for the inode (A7) records the delegation of the authority 108 in the metadata 302 stored in the segment 114 controlled by the authority for the inode (A7). In this embodiment, the delegation of an authority is persisted prior to the writing of any data 302 or metadata 302 to the segment 114 controlled by the newly delegated authority. Writing the data 302 and the metadata 302 to that segment 114 is controlled by the delegated authority 108, and is responsive to persisting the delegating of the second authority. This sequence, of delegating an authority 108, persisting that authority 108 and recording that delegation of the authority 108 in the metadata 302 in the segment 114 under control of the authority of the inode (A7), is performed each time the write offset is associated or detected as being with a different range of data for the file. When this happens, an authority 108 is delegated for the next chunk of data or range of file, up to the next logical offset.

Still referring to FIG. 3, any further data, for example in an append operation, is added to the segment 114 under control of the latest or most recent delegated authority 108, as indicated by the action to append data here 312. In this embodiment, various attributes 310 of the file including the file size, modification time, permissions, etc., are written in metadata 302 in the segment 114 controlled by the delegated authority 108 (e.g., A31). In this manner, with the metadata 302 and data 304 closely associated in the segment 114, or differing segment, it is straightforward to check the permissions (if needed), update the file size, and record the time at which the file is modified in the same segment 114 in which the data 304 is appended to the file. As with previously written segments 114, if or when the total amount of data 304 in that segment 114 reaches the predefined limit for the segment 114, i.e., the write offset is associated with another segment, the authority of the inode (A7) delegates another authority 108. Further data 304 can then be written or appended to the segment 114 under control of that delegated authority 108. The metadata 302 in the segment 114 controlled by the authority 108 of the inode of the file thus has information about which authority 108, namely the delegated authority 108, has metadata 302 with the attributes 310 about the file size, modification time and permissions of the file and controls the segment 114 to which any further data is to be appended (up to the limit for the particular segment).

With reference to FIGS. 1-3, to read a file, the authority 108 of the inode of the file (A7) is consulted. Metadata 302 in the segment 114 under control of the authority of the inode (A7) has a mapping, which could be in tables for example, and which in some embodiments indicates the logical offset for the file and a map to a particular segment/page pair. The metadata 302 could include a directory with information about the write offset for the segment that the data is located within. This could include a pointer which indicates where the data for the file is found. In some embodiments, the metadata 302 in the segment 114 under control of the authority of the inode (A7) has information about all of the authorities 108 associated with the file, including the most recently delegated authority. In some embodiments, the metadata 302 in each segment 114 under control of an authority 108 has information about the next authority in the chain of authorities. In some embodiments, an authority from which data is going to be read can be calculated directly based on an inode and an offset. In each of these embodiments, data under control of an authority 108 can be determined by reading the metadata 302 in the segment 114 under control of that authority 108, so that the chunks of data or a range of a file can be read in sequence, for example to support a file read request. With each authority 108 controlling a range of data, the system avoids the bottlenecks that are associated with performing reads or writes of a large file all under control of a single entity (and associated processor or node).

Figure 4:
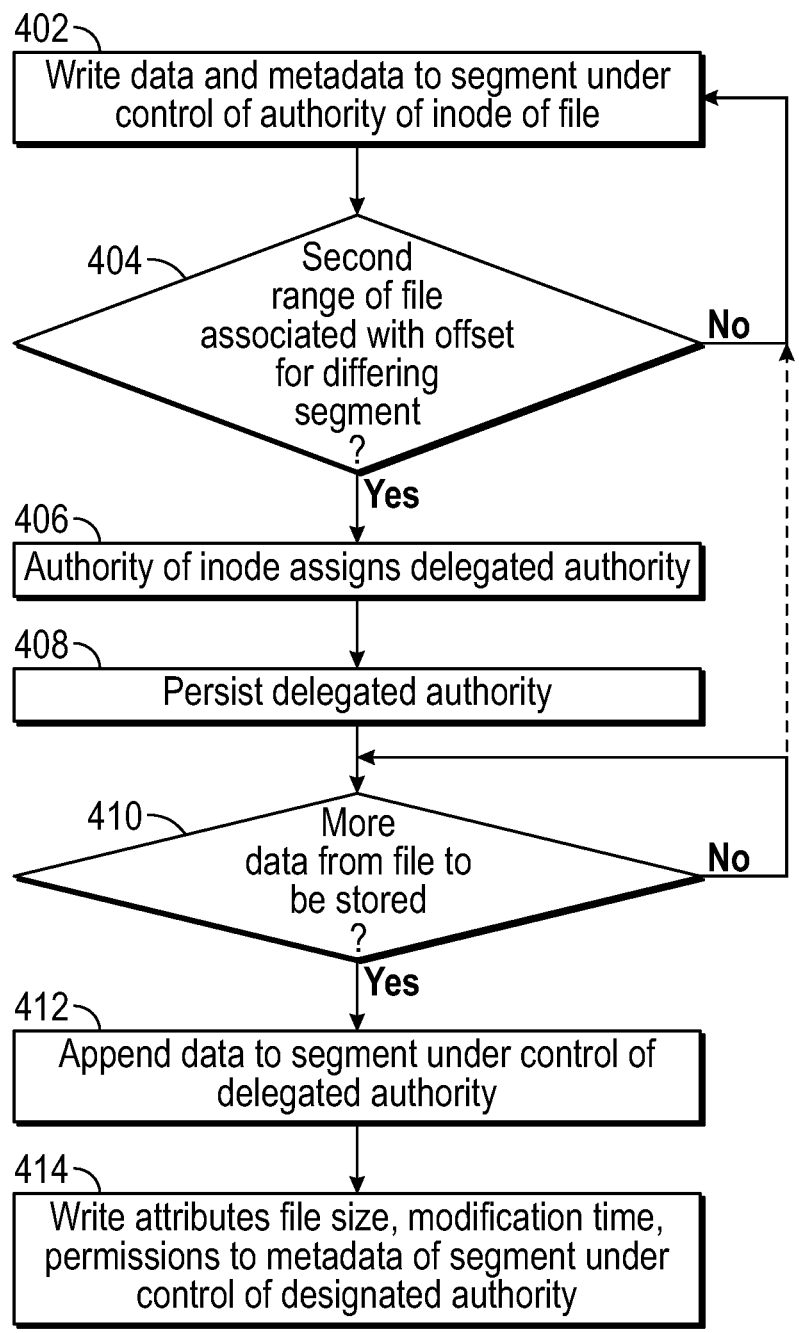
FIG. 4 is a flow diagram of a method for locating data and metadata closely together in a storage system in accordance with some embodiments.

FIG. 4 is a flow diagram of a method for locating data and metadata closely together in a storage system. The method can be performed by a storage system, more specifically by one or more processors of a storage system. The storage system has storage memory arranged in segments, and authorities which can be implemented in software executing on one or more processors. In an action 402, a first range of a file and metadata are written to at least one segment under control of an authority of the file. In a decision action 404, it is determined whether a second range of the file is associated with a write offset for a differing segment. If the answer is no, the second range of the file is not associated with a write offset for a differing segment, flow branches back to the action 402, and the range of the file may be written to the segment under control of the original authority. If the answer to the decision action 404 is yes, second range of the file is associated with a write offset for a differing segment, flow proceeds to the action 406. In the action 406, the authority of the inode (the original authority) assigns a delegated authority. In an action 408, the delegated authority is persisted, which can be performed with the use of a token as described above.

In a decision action 410 of FIG. 4, it is determined whether there is more data from the file to be stored. If the answer is no, there is not (at present) more data to be stored from the file, flow branches back to the decision action 410, to await more data, or alternatively branches back to the action 402, for data of a further file to be written to a further segment under control of a further authority. If the answer is yes, there is more data from the file to be stored, flow proceeds to the action 412. In the action 412, data is appended to the segment under control of the delegated authority. In the action 414, attributes, including file size, modification time, permissions, etc., are written to metadata of the segment under control of the delegated authority. As noted above with reference to FIG. 3, the authority of the inode (the original authority) tracks which authority is a most recently delegated authority as well as the chain of authorities.

Figure 5:
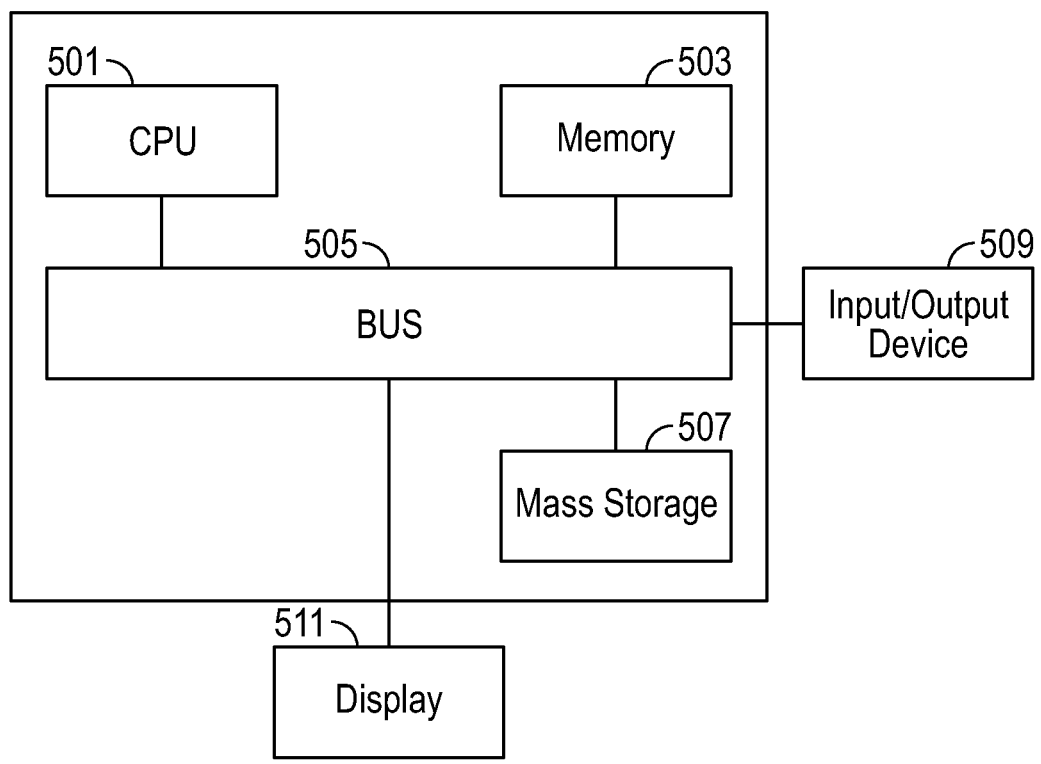
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for locating data and metadata closely together in a storage system in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, OS/2™, UNIX™, LINUX™, iOS™ or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    writing a first portion of data of a file and a first metadata relating to attributes of the file into a first segment controlled by a first owner of the file;
    delegating, by the first owner, a second owner for control of a second portion of data of the file, wherein delegation of the second owner is persisted by the first owner; and
    writing the second portion of data of the file and second metadata associated with the attributes of the file into a second segment controlled by the second owner.

2. The method of claim 1, wherein:
    delegating the second owner is associated with a write offset.

3. The method of claim 1, further comprising:
    writing metadata indicating which owner has a most recent update to a size and a modification time of the file into the first segment controlled by the first owner, and wherein the segments are striped across storage memory in a storage system.

4. The method of claim 1, wherein writing the second portion of data of the file and the second metadata is responsive to the persisting the delegating the second owner.

5. The method of claim 1, further comprising:
determining, from the first metadata in the first segment and the first owner, which of a plurality of owners is a delegated owner;
appending further data of the file to a further segment controlled by the delegated owner; and
writing further metadata to the further segment controlled by the delegated owner.

6. The method of claim 1, wherein the attributes of the file include at least one of a size of the file, a modification time of the file, and permissions of the file.

7. The method of claim 1, further comprising:
reading data from the first segment controlled by the first owner;
determining, from the first metadata in the first segment controlled by the first owner where to find the second owner and the second segment controlled by the second owner; and
reading data from the second segment controlled by the second owner.

8. A system, comprising:
storage memory, configurable to have a plurality of segments that are logical containers of data in an address space for the segments; and
at least one processor, configured to write data of a file and metadata relating to attributes of the file into the plurality of segments of the storage memory under a plurality of owners, wherein a first portion of the data of the file and a first metadata are in a first segment controlled by a first owner of the file, and a second portion of the data of the file and a second metadata are in a second segment controlled by a second owner, and wherein the first owner of the file is configured to delegate ownership of a portion of data of the file to the second owner.

9. The system of claim 8, further comprising:
the first owner of the file configured to delegate the second owner responsive to a write offset associated with the second portion of data of the file.

10. The system of claim 8, wherein the first metadata indicates which of the plurality of owner, other than the first owner, has metadata including a most recent update to size of the file and modification time of the file.

11. The system of claim 8, further comprising:
the at least one processor configured to persist a delegation of an owner using a token.

12. The system of claim 8, further comprising:
the at least one processor configured to determine from the first metadata which owner is a delegated owner as delegated by the first owner; and
the at least one processor configured to write further data of the file and further metadata pertaining to the file to a further segment under the delegated owner, and wherein the segments are striped across storage memory in the system.

13. The system of claim 8, further comprising:
the at least one processor configured to determine from the first metadata which owner is a delegated owner as delegated by the first owner; and
the at least one processor configured to write further metadata including at least one of permissions of the file, an updated size of the file, and an updated modification time of the file to a further segment under the delegated owner.

14. The system of claim 8, wherein the attributes of the file include at least one of a size of the file, a modification time of the file, and permissions of the file.

15. A system, comprising:
storage memory, configurable to have segments that are logical containers of data in an address space for the segments;
a plurality of owner implemented in the data storage system with each owner configurable to be an owner of a plurality of portions of data of files; and
at least one processor in communication with the storage memory, configured to perform actions comprising:
writing data of a first portion of data of a file and a first metadata relating to attributes of the file into a first segment controlled by a first owner of the file;
delegating, by the first owner, a second owner for control of a second portion of data of the file; and
writing data of the second portion of data of the file and second metadata relating to the attributes of the file into a second segment controlled by the second owner.

16. The system of claim 15, wherein delegating the second owner is associated with a write offset.

17. The system of claim 15, wherein the actions further comprise:
persisting the delegating the second authority using a token, wherein the writing the data of the second portion of data of the file and the second metadata is responsive to the persisting the delegating the second owner.

18. The system of claim 15, wherein the actions further comprise:
writing metadata indicating which authority has a most recent update to a size and a modification time of the file into the first segment controlled by the first owner.

19. The system of claim 15, wherein the actions further comprise:
determining, from the first metadata in the first segment and the first owner, which of a plurality of owner is a delegated owner;
appending further data of the file to a further segment controlled by the delegated owner; and
writing further metadata to the further segment controlled by the delegated owner.

20. The system of claim 15, wherein the actions further comprise:
reading data from the first segment controlled by the first owner;
determining, from the first metadata in the first segment controlled by the first owner where to find the second owner and the second segment controlled by the second owner; and
reading data from the second segment controlled by the second owner.

* * * * *